(12) United States Patent
Dunlop et al.

(10) Patent No.: US 7,479,226 B2
(45) Date of Patent: Jan. 20, 2009

(54) SYSTEM FOR REMOVAL OF CONTAMINANTS FROM AQUEOUS SOLUTION

(76) Inventors: Eric H. Dunlop, 39 Church Road, Paradise, South Australia (AU) 5075; Ravendra Naidu, 87 Qultin Court, Pasadena, South Australia (AU) 5042; Megharaj Mallavarapu, 21 Ontario Avenue, Panorama, South Australia (AU) 5041

( * ) Notice: Subject to any disclaimer, the term of this patent is extended or adjusted under 35 U.S.C. 154(b) by 0 days.

(21) Appl. No.: 11/702,940

(22) Filed: Feb. 5, 2007

(65) Prior Publication Data
US 2007/0289910 A1 Dec. 20, 2007

Related U.S. Application Data

(63) Continuation of application No. 11/112,595, filed on Apr. 22, 2005, now Pat. No. 7,172,691, which is a continuation of application No. PCT/IB03/05301, filed on Oct. 24, 2003.

(60) Provisional application No. 60/420,954, filed on Oct. 24, 2002, provisional application No. 60/435,963, filed on Dec. 21, 2002.

(51) Int. Cl.
*C02F 3/00* (2006.01)
(52) U.S. Cl. ..................... 210/602; 210/603
(58) Field of Classification Search .......... 210/602–603
See application file for complete search history.

(56) References Cited

U.S. PATENT DOCUMENTS

| 3,963,576 A | * | 6/1976 | Horsfall et al. | ................. 435/42 |
| 4,084,346 A | * | 4/1978 | Stengel et al. | ........... 435/292.1 |
| 2003/0228684 A1 | * | 12/2003 | Burbidge et al. | ......... 435/292.1 |

* cited by examiner

*Primary Examiner*—Chester T Barry
(74) *Attorney, Agent, or Firm*—Holme Roberts & Owen LLP

(57) ABSTRACT

A system and method for removal of uranium and other contaminants from aqueous solution, utilizing live algae, are described. The system includes a bioreactor, in which a reaction mixture of live algae, preferably photosynthetic algae, and contaminated solution are introduced; a means for introducing carbon dioxide gas in the reaction mixture; a means for exposing the reaction mixture to light; means for mixing and impelling the reaction mixture; and means for separating out algae from remediated solution.

8 Claims, 8 Drawing Sheets

SYSTEM FOR REMOVAL OF CONTAMINANTS FROM AQUEOUS SOLUTION

CROSS-REFERENCE

This application is a continuation of Ser. No. 11/112,595, filed on Apr. 22, 2005, now U.S. Pat. No. 7,172,691 titled, "Method and System for Removal of Contaminants from Aqueous Solution," which is a continuation of International Application PCT/IB03/05301 filed on Oct. 24, 2003, claiming priority to U.S. provisional applications Ser. No. 60/420,954, filed on Oct. 24, 2002, and Ser. No. 60/435,963 filed on Dec. 21, 2002, which are now abandoned.

BACKGROUND ART

Various methods have been applied to remove uranium and other contaminants from aqueous solution. An established method involves inorganic or organic ion exchange resins. Ion exchange processes are generally most effective at high concentrations of uranium in solution, but less effective at relatively low concentrations of uranium, in the 0-20 ppm range, due to their reversibility. Ion exchange processes thus do not have the capacity to effect final clean up of dilute uranium-contaminated bodies of water, bringing them within water quality standards adopted by the U.S. federal government (100 parts per billion), the Canadian federal government (40 parts per billion) and other jurisdictions that have stringent water quality rules.

Electrodialysis and reverse osmosis have also been employed for removal of uranium and other contaminants, but are considered very expensive because they generally require large quantities of electrical power.

Wetland remediation has also been used, in the sense that mosses and grasses in a wetland environment have been used to remove uranium from contaminated water introduced into the wetland. A problem with this method is that the uranium remains in the wetland after remediation is completed. In wetland remediation, the uranium is absorbed by plants and land in and around the wetland area, contaminating them. Also, there is some indication that, at night, when the temperature drops, the wetland releases the uranium back into the water. In other words, this process appears to be reversible.

Certain types of bacteria have been used to remove uranium and other contaminants from solution. Bacteria require a nutrient medium to grow and reproduce. Accordingly, they may require a sterile environment, because they may be prone to competition with other biological contaminants that consume the nutrient medium. Also, certain bacteria do not grow well in alkaline environments, and so would not work well in uranium-contaminated water having a high pH. Some bacteria may be regarded as unsafe for human operators. Further, to the extent the bacteria have been genetically modified, there is additional cost involved in development and production and regulation of the genetically modified bacteria.

Dead algal biomass has been used in a limited way to remove uranium from solution. In addition, it has been recognized that live photosynthetic algae remove uranium from solution. It is understood, however, that little effort has been made to adapt photosynthetic algae in a system and method for large scale removal of uranium, similar radioactive constituents, and other contaminants from water in field and industrial conditions.

TECHNICAL FIELD

The field includes removal of uranium, other actinides, and other substances from contaminated aqueous solution. The field also includes use of algae to remove contaminants from aqueous systems.

SUMMARY OF INVENTION

A system and method for removal of uranium and other contaminants from aqueous solution is described, utilizing live algae. A preferred embodiment employs photosynthetic algae, although partially photosynthetic as well as non-photosynthetic algae can be used in alternative embodiments. In a preferred embodiment, the system employs a bioreactor structured as an open tank, the tank having a maze configuration, with the reaction mixture circulated through the tank configuration. The reaction mixture includes a quantity of contaminated aqueous solution which is sought to be remediated, and a selected quantity of live photosynthetic algae. In a preferred embodiment, a nutrient solution including a minimum amount of trace nutrients is added. The algae is selected for its capacity to remove a contaminant from the aqueous solution. In a preferred embodiment, the contaminant is a uranium species known to be present in the solution and the algae is a variety of photosynthetic algae that has been determined to be effective in removing the uranium species from solution. A preferred algae is *Chlorella* (for example, *Chlorella* CP or *Chlorella* CV), which is known to be very effective in removing various uranium species from solution. Other algae have been shown to remove uranium, and the description is not intended to limit the invention to *Chlorella* or any other specific type of algae. The reaction mixture of aqueous solution and algae is introduced into the reactor via an inlet. An impelling means situated in the reactor causes the reaction mixture to circulate through the reactor tank configuration. The system also includes a means for introducing carbon dioxide gas into the reaction mixture. In a preferred embodiment, the tank is open and situated such that sunlight will fall on the reaction mixture during daytime hours. Artificial lighting also may be used. The photosynthetic algae utilize light and carbon dioxide for growth. The reactor system includes mixing means, such as a plurality of static mixers, that turn or rotate the reaction mixture, such that a portion of reaction mixture on the bottom of the tank is brought to the top, allowing algae throughout the mixture to be exposed to light. In a preferred embodiment, the reaction mixture is cycled through the tank configuration multiple times, to enable the algae to grow and interact with the targeted contaminant. An outlet in the reactor is utilized to bleed a portion of the reaction mixture from the reactor, while an equal amount of fresh reaction mixture is introduced through the inlet. Reaction mixture removed from the reactor is then passed through a means for separating algae from the reaction mixture, such as centrifuge, or a filter press or sieve. Removal of the algae also removes with it a portion of the targeted contaminant in the solution. The remediated solution remaining after removal of algae is then directed to the original source or another appropriate use. In an alternative embodiment, the system can be adapted for use of partially photosynthetic or non-photosynthetic algae. In this embodiment, a cheap carbon source, such as sewage or a sugar waste product, is introduced to provide a nutrient substrate for the algae.

In other embodiments, the reactor may be structured of closed transparent tubing, through which light can be transmitted to the reaction mixture, formed in a looped and sheared or staggered configuration, and having impelling and mixing means, as well as a means for introducing carbon dioxide. This embodiment also is operated to recycle the reaction mixture as with the open tank configuration, and to bleed off reaction mixture that is then passed through a separating means, to remove algae containing the targeted contaminant. A further embodiment places reactors in series, which allows for additional processing time and enhanced removal of the targeted contaminant. An additional embodiment is adapted for use alongside a large body of water, such as a lake, wherein the lake becomes part of the reactor system, and a series of gas lift reactors are situated around the lake, and function to create a circulation and mixing of water, and carbonation, in the lake water. The system includes seeding the lake with algae, and passing the lake water through the gas lift reactor to introduce carbon dioxide and induce a circulation pattern in the lake water, to enhance exposure of the algae to carbon dioxide. The system also includes means for separating algae from the lake water, such as through a filtering device, to remove algae that contain the targeted contaminant. What follows is a more detailed description of the various embodiments of the present system and method.

DETAILED DESCRIPTION

Figure 1:
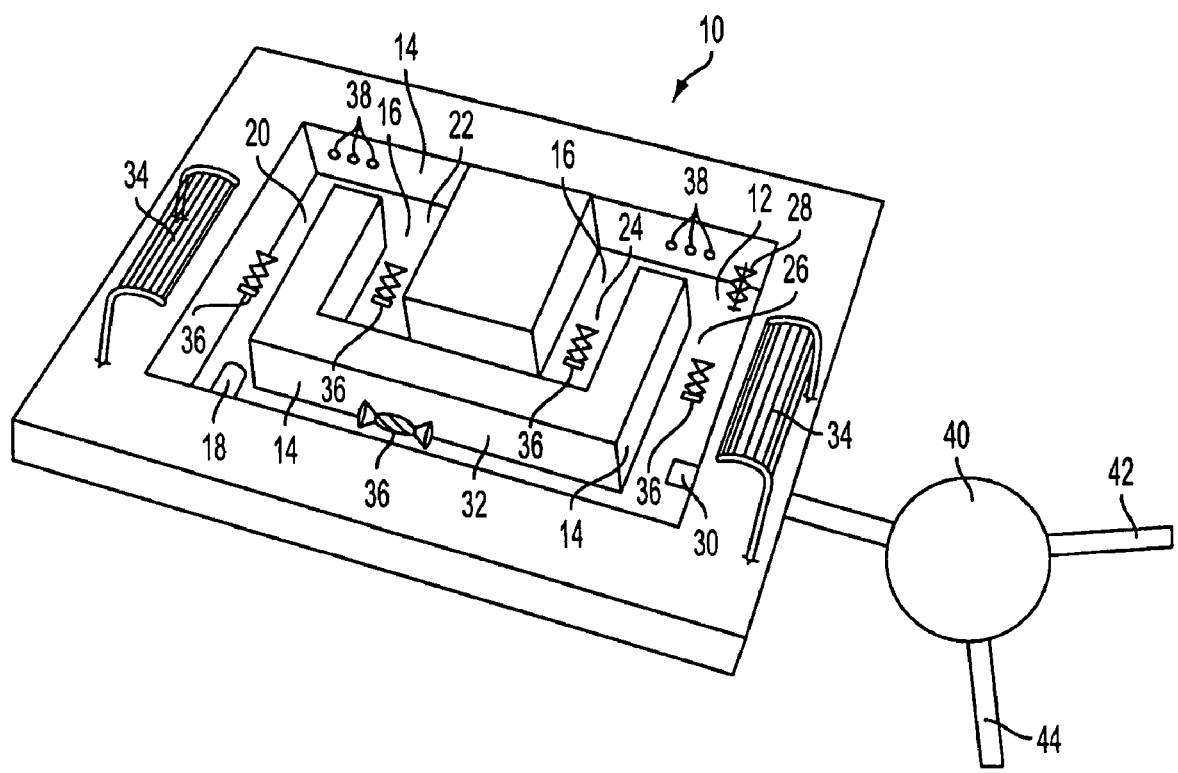
FIG. 1 is a perspective view of the reactor of the present system, in a maze configuration.

A live, photosynthetic bioreactor method and system for removing uranium and other substances from aqueous solution is described, the system being especially advantageous for removal of uranium from solution having low levels of uranium contamination, in the 0-20 ppm range.

Various photosynthetic algae show a promising capacity to remove uranium from aqueous solution, even dilute solution with uranium concentrations in the range of 0-20 ppm. These include *Chlorella*, which shows a wide range of ability to remove most uranium species, as well as *Scenedesmus* SR, *Scenedesmus* SE, *Oocystis*, and *Chlamydomonas*.

Scanning election microscopy of various photosynthetic algae has demonstrated that, after treatment of uranium-contaminated water with the above-referenced algae, while some surface binding of uranium to the algal cells was observed, most of the uranium was bound within the algal cells, in micronodules. These algae include:

*Chlorella* sp. MM1 (*Chlorella* CV);
*Chlorella* sp. MM2 (*Chlorella* CP);
*Scenedesmus* sp. MM3 (*Scenedesmus* SR);
*Scenedesmus* sp. MM4 (*Scenedesmus* SE);
*Oocystis* sp. MM5 (*Oocystis* sp.);
*Chlorococcum* sp. MM6 (*Chlorococcum*);
*Chlamydomonas* sp. MM7 (*Chlamydomonas*);

Additionally, the varieties of algae examined concentrate uranium in large amounts, producing algal cells that frequently contain at least 2% w/w of uranium and up to 10% w/w of uranium. It should be noted that many ores currently being recovered are in the range of 0.5% uranium down to 0.1% uranium, such that "mining" harvested algae is potentially a profitable operation. Comparison of the capacity of autoclaved (dead) algal samples to concentrate uranium with live samples indicates that live algae concentrate substantially more uranium, suggesting that active biological uptake is the dominant mode of uptake, not simple adsorption. A further conclusion is that the algae remain viable and continue to grow and absorb uranium in the presence of uranium-contaminated solutions and following uptake of uranium. This indicates that live algae can be utilized to remove and concentrate uranium over a period of time. Further, the removal of uranium from solution by such algae appears to be largely irreversible.

Photosynthetic algae are relatively simple and cost-effective to grow and maintain. The algae can grow photosynthetically on $CO_2$ and sunlight, plus a minimum amount of trace nutrients. They also can alternatively or additionally grow on another carbon source, such as glucose or sucrose, or waste water. They are generally regarded as environmentally friendly and safe for human operators. Certain algae can concentrate multiple uranium species in solution, such as *Chlorella*, which demonstrates a strong capacity to concentrate uranium species present in contaminated water at various pH levels. Given the similarity of the chemistry of uranium, and that of plutonium and technetium, photosynthetic algae are also expected to work equally well to remove plutonium and technetium from aqueous solution. Additionally, the present system and method are applied to various uranium species in solution, and are envisioned as applicable to daughter products of uranium decay. The algae can be used with cobalt, strontium and cesium. The algae are also expected to work well to remove chromium and other heavy metals. It is contemplated that the system and method can be applied to any trans-uranium species in aqueous solution, (elements with atomic numbers greater than that of uranium).

The present system and method provide enhanced removal of uranium from bodies of contaminated water. In one embodiment, and as depicted in FIG. 1, the photosynthetic system includes a reaction vessel or reactor 10 exposed to sunlight from above. The reactor is a single open tank 12 arranged in a maze configuration. The tank 12 has side walls 14 and a floor 16 and is open at the top. This configuration facilitates a reaction process in which the reaction mixture is circulated through the tank system in a clockwise direction. Uranium-contaminated solution is introduced into the tank 12 at an inlet 18 and flows into the first section 20 of tank 12. As the contaminated solution is introduced into the system, it is mixed with live algae to form a reaction mixture. In certain embodiments, a nutrient medium is also added to enrich the reaction mixture. Mixing of algae with contaminated solution, and with a nutrient medium if desired, can be achieved outside the tank, or within the tank, as will be appreciated by those familiar with the field. In other embodiments, alternate tank configurations can be utilized such as a simple circuit configuration (without the complexity of the maze configuration), a stirred tank reactor, or a plug flow reactor, and the present description is not intended to limit the tank configurations that may be utilized or the flow of reaction mixture through the tank configurations.

The algae utilized in the embodiment of FIG. 1 may be any of the photosynthetic algae referenced above as well as other algae known as capable of removing uranium by those familiar with the field and varieties of algae collected and applied in particular site conditions. It is contemplated that each application of the present system at a specific site will involve selection of algae to be used, including preliminary testing of selected algae against the particular conditions of the waters to be remediated, and the conditions of the site such as temperature, and light conditions. Additionally, selection can include collection and testing of wild algae on the site. It is contemplated that, in some circumstances, the most suitable algae for remediation of water at a specific site, such as water in a pit lake, are algae collected from the site, which remove uranium from contaminated water under the conditions existing at the site. While the amount of algae to be added to the contaminated solution may be varied depending on the level of contamination and other factors, including the variety of algae selected, a quantity of algae in the range of about 5-10 grams of algae per liter of solution is expected to be suitable in most cases. The nutrient medium is any mixture of trace nutrients capable of sustaining algae in the conditions of the site. An example of a nutrient medium is a solution including the following constituents (the concentration for each constituent is milligrams per liter): $NaNO_3$, 250; $CaCl_2 \cdot 2H_2O$, 25; $MgSO_4 \cdot 7H_2O$, 75; $K_2H_2PO_4$, 75; $KH_2PO_4$, 175; $NaCl$, 25; $KOH$, 31; $FeSO_4 \cdot 7H2O$, 5.0; $H_3BO_3$, 11.4; $ZnSO_4 \cdot 7H_2O$, 8.8; $MnCl_2 \cdot 4H_2O$, 1.44; $MoO_3$, 0.7; $CuSO_4 \cdot 5H_2O$, 1.57; $Co[NO_3]_2 \cdot 6H_2O$, 0.50 and EDTA, 50. It should be noted that the present system can also be adapted to the use of partially photosynthetic and non-photosynthetic algae, and that in such alternative embodiments, an enriched nutrient mixture including a cheap carbon source, such as comes from sewage or a sugar waste product, is preferably introduced, as will be appreciated by those familiar with the art, to promote algal growth.

In a preferred embodiment, an acidic or alkaline material may be added to adjust the pH of the reaction mixture, if it is desired to coordinate the pH of the solution to the algae used, and depending on whether the pH of the contaminated solution is outside of the range preferred by the algae. Generally, an alkaline environment is preferred (pH of approximately 8-10), because photosynthetic algae such as those referenced above tend to be most productive in an alkaline environment, and because such an environment also discourages bacterial growth. Yet, various algae are generally tolerant of a more acidic environment, and it is envisioned that the present method and system will also be used with other algae that prefer an acidic environment. The use of acid-tolerant algae will be especially advantageous for removing uranium and other contaminants from aqueous products of acid leaching processes.

Figure 2:
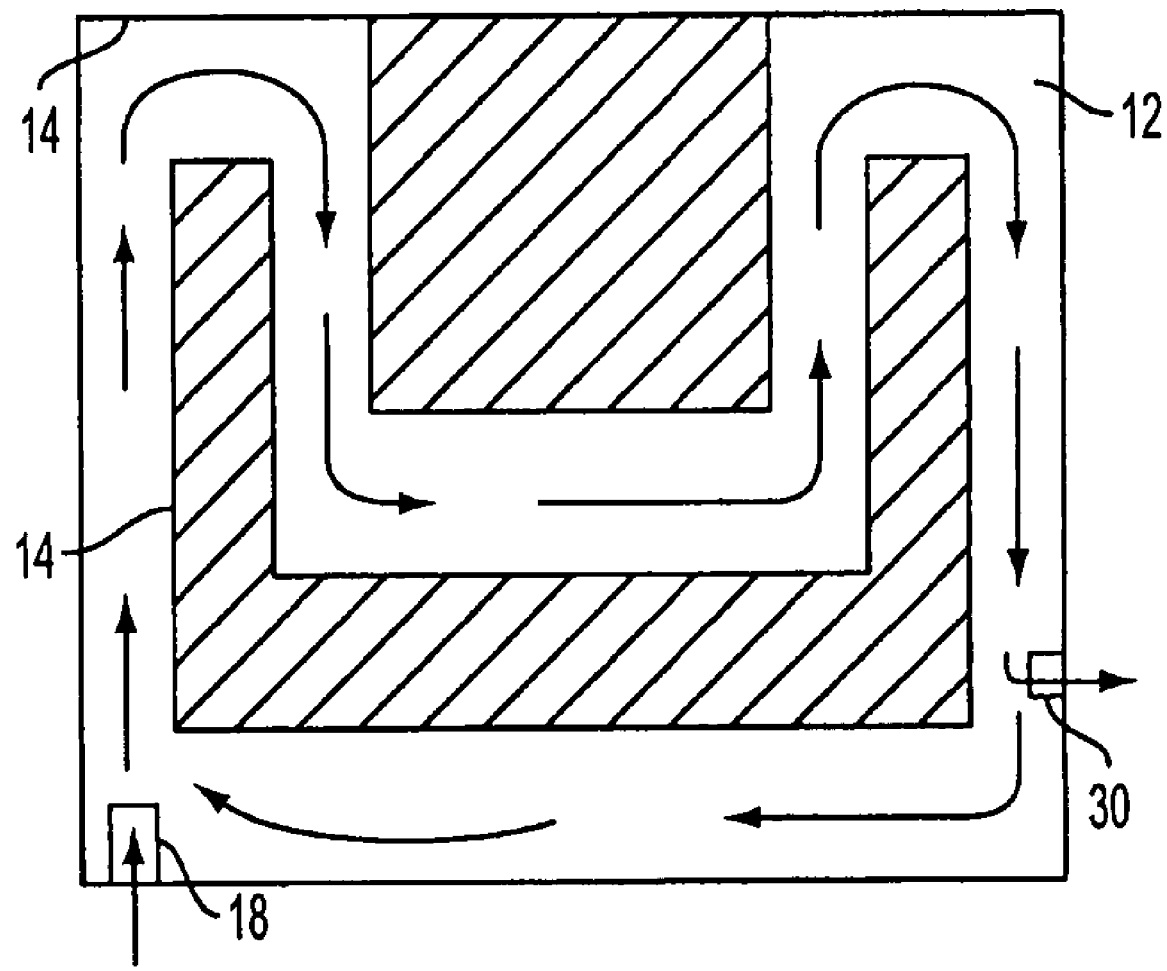
FIG. 2 is a top view of a portion of the embodiment of FIG. 1 depicting flow of reaction mixture.

Referring again to FIG. 1, the reaction mixture is impelled into succeeding sections 22, 24, and 26 of the tank 12 by a mechanism 28 (such as a rotor blade, pump, or gas jets) that promotes fluidic flow through the tank configuration. As will be discussed below, in the present embodiment carbon dioxide gas also will be introduced into the reaction mixture as it moves through the tank configuration. The injection of carbon dioxide gas (or air) can be accomplished to promote mixing and impelling of the reaction mixture. The reaction mixture moves through the tank system towards a section 26 of tank 12 where a portion of reaction mixture is bled from the tank at an outlet 30. The remaining volume of reaction mixture is then recycled back around the tank configuration through a recycle section 32 to the first section 20. As the reaction mixture flows along through the tank configuration, the algal cells in the reaction mixture take in uranium from the solution. This process of uranium removal by algal cells continues as the reaction mixture is cycled around the tank configuration. FIG. 2 is a schematic view of the flow of reaction mixture through the embodiment of tank 12 depicted in FIG. 1 (viewed from above).

The reaction mixture completes at least one cycle through the tank configuration and, in a preferred embodiment, circulates multiple times, as a function of the growth rate of the algae utilized. In the present embodiment, the algae growth rate is projected to be up to approximately 0.2 reciprocal hours. In this embodiment, the bleed rate at the outlet is 5% which is equal to the inlet flow rate. The process is primarily envisioned to be a continuous one. To achieve optimal removal of uranium, it would be expected that the reaction mixture would pass around the tank configuration approximately 20 times, that is, with 5% of the total volume being bled.

Figure 3:
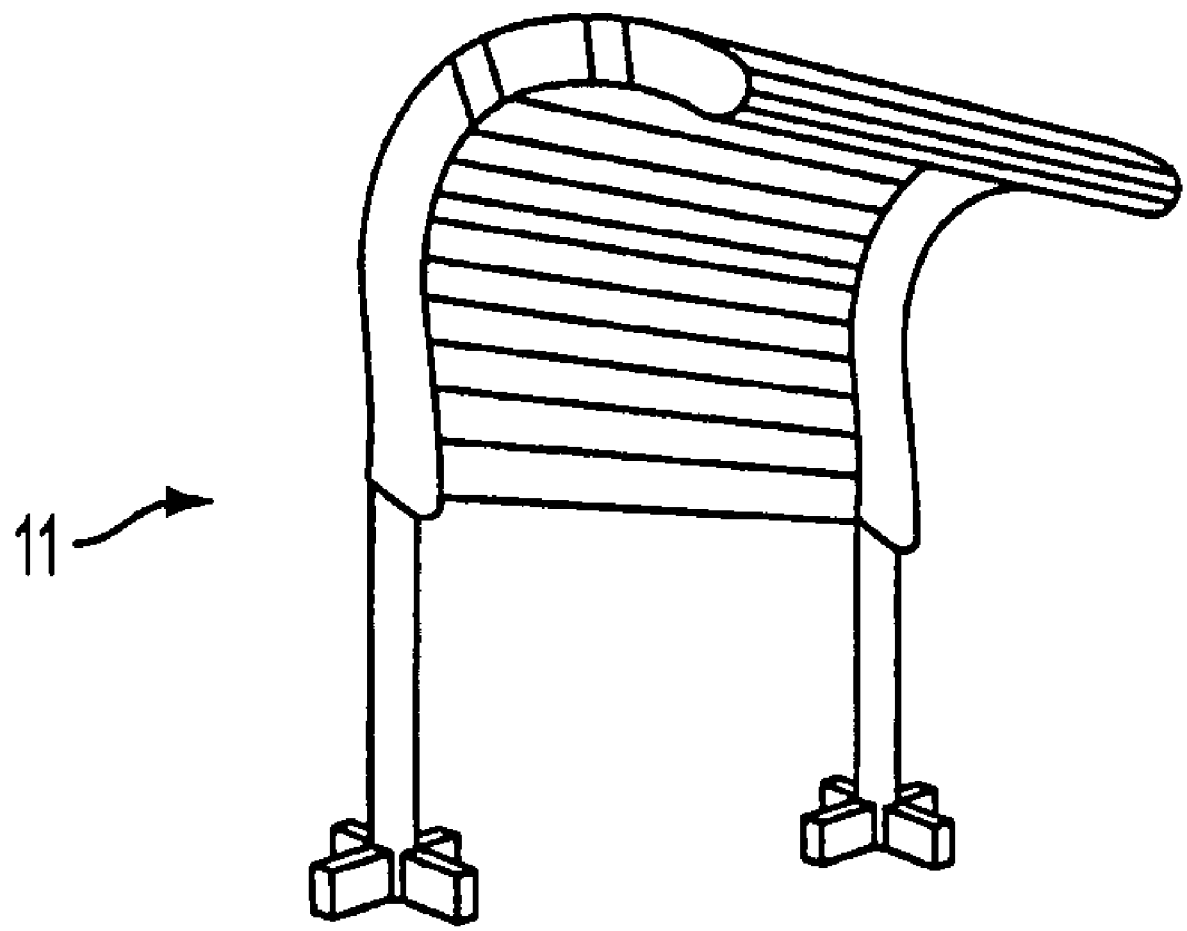
FIG. 3 is an enlarged perspective view of a Fresnel lens of the embodiment of FIG. 1.

A further aspect of the present system is a means for exposing the reaction mixture to light to enhance production of algae, and removal of uranium. In the present embodiment, as depicted in FIG. 1, this includes a combination of features, the open tank system, and positioning of the tank out doors to receive sunlight or in a structure where light can fall on the top of the tank, and positioning of one or more Fresnel lenses 34 above the tank 12. The Fresnel lenses 34 collect and direct sunlight into the reaction mixture to enhance exposure of algae in the reaction mixture to light. Fresnel lenses are, at their simplest, glass or plastic sheets with finely scored lines or ridges formed in the sheets. They can be flat or formed with a curvature to provide greater focus into the reaction mixture. FIG. 3 provides a three dimensional illustration of a preferred Fresnel lens arrangement 11. In another embodiment, a single Fresnel lens, or another mechanism for focusing, reflecting or otherwise directing light towards the reaction mixture, such as a mirror, or combination of mirrors, or no such mechanism, can be used. In a further embodiment, the system includes a computerized method for optimizing the concentration of light on the mixture, through a software package such as Mathematica Optica. Such a package can be used to find the best combination of number, size and placement of Fresnel lenses as a function of variables including the size and configuration of the tank, the use of reflective surfaces, and environmental conditions including path of the sun. While the preferred embodiment utilizes natural light, other embodiments are envisioned that use artificial light, either as a substitute for sunlight or as a supplement to sunlight. In one embodiment, for example, sunlight is used during daytime hours and an artificial light source is used during all or part of the night time hours, to maintain high activity of the algae. It should be noted that other embodiments are used which are not dependent on light. These embodiments employ algae that can go without light for long periods, or that can use an energy source without the need for light.

The algae of the present embodiment utilizes the light falling on the reaction mixture, plus a carbon source and nutrients in the reaction mixture, to grow and reproduce, and to fuel processes within the algal cells that result in intake of uranium from the reaction mixture. Because the reaction mixture contains algae and other constituents, which absorb and block light from above, the quantity of light reaching the solution towards the bottom of the tank and away from the surface may be substantially lower than that at the surface. In a dense and unstirred solution, only a thin layer of algal solution, at or close to the surface, is optimally active and productive. An unstirred solution is two-dimensional, and suffers from the same limitation from which many solar power systems suffer: scaling up to increase production requires extensive space in order to increase exposure to the sun. A further aspect of the present system and method is a means for mixing and rotating the reaction mixture, allowing algae at the tank bottom to be brought to the surface and exposed to light, enhancing growth of the algae and absorption of uranium. In the present embodiment, this mixing means is one or more static mixers 36, as depicted on FIG. 1. Other mechanisms for mixing the reaction mixture, as may be known in the field, can be used in place of a static mixer, including other mechanical stirrers, magnetic stirrers, carbon dioxide bubblers, and water or air jets.

In one embodiment of the present system, the system also includes a means for introducing carbon dioxide into the reaction mixture. The reaction mixture is exposed to air at its surface, and a portion of carbon dioxide from the air is dissolved in the reaction mixture in an open tank system. Turning or mixing the reaction mixture increases exposure of the mixture to air and enhances dissolution of carbon dioxide into the reaction mixture. Other methods of introducing carbon dioxide into the reaction mixture can be employed, as will be appreciated by those experienced in the field, including a carbon dioxide bubbler or jet (or multiple bubblers or jets), introducing carbon dioxide gas into the reaction mixture at one or multiple gas ports 38 in the tank, as depicted in FIG. 1. The carbon dioxide bubblers or jets can also serve as mixing and impelling means. Additionally, another method involves increasing the concentration of carbon dioxide in the air above the tank, such as by forming a sealed enclosure over the surface of the tank, and introducing carbon dioxide gas in the area over the surface and within the enclosure to form a carbon dioxide rich atmosphere above the surface of the reaction mixture.

Referring again to FIG. 1, the present embodiment also includes a means for separating out the algae from the portion of the reaction mixture removed from the tank 12 at outlet 30. In the present embodiment, the means for separating out the removed algae is a centrifuge 40. As will be understood by those experienced in the field, other methods may be used, and, in other embodiments, various types of filters or sieves, or a filter press, or decanter, can be substituted. From the centrifuge 40, the separated algae is then removed through a conduit 42, and the remaining, now remediated, water is withdrawn in a second conduit 44. Removal of the algae, in turn, removes the uranium taken up by the algae from the reaction mixture, and leaves behind remediated water with a reduced uranium content. In one embodiment, the algae which is removed, can then be disposed, or subjected to a further process of harvesting the uranium from the algae.

In the present embodiment, the system includes a recycling feature, such that the portion of the reaction mixture which is not diverted for separation of algae at outlet 30 is returned via section 32 to the first section 20, where it joins newly introduced contaminated solution, fresh algae and nutrient medium. The reaction mixture is cycled around the tank configuration, while stirred and exposed to sunlight, multiple times, which permits the algae to grow and reproduce, and absorb uranium from the solution.

Figure 4:
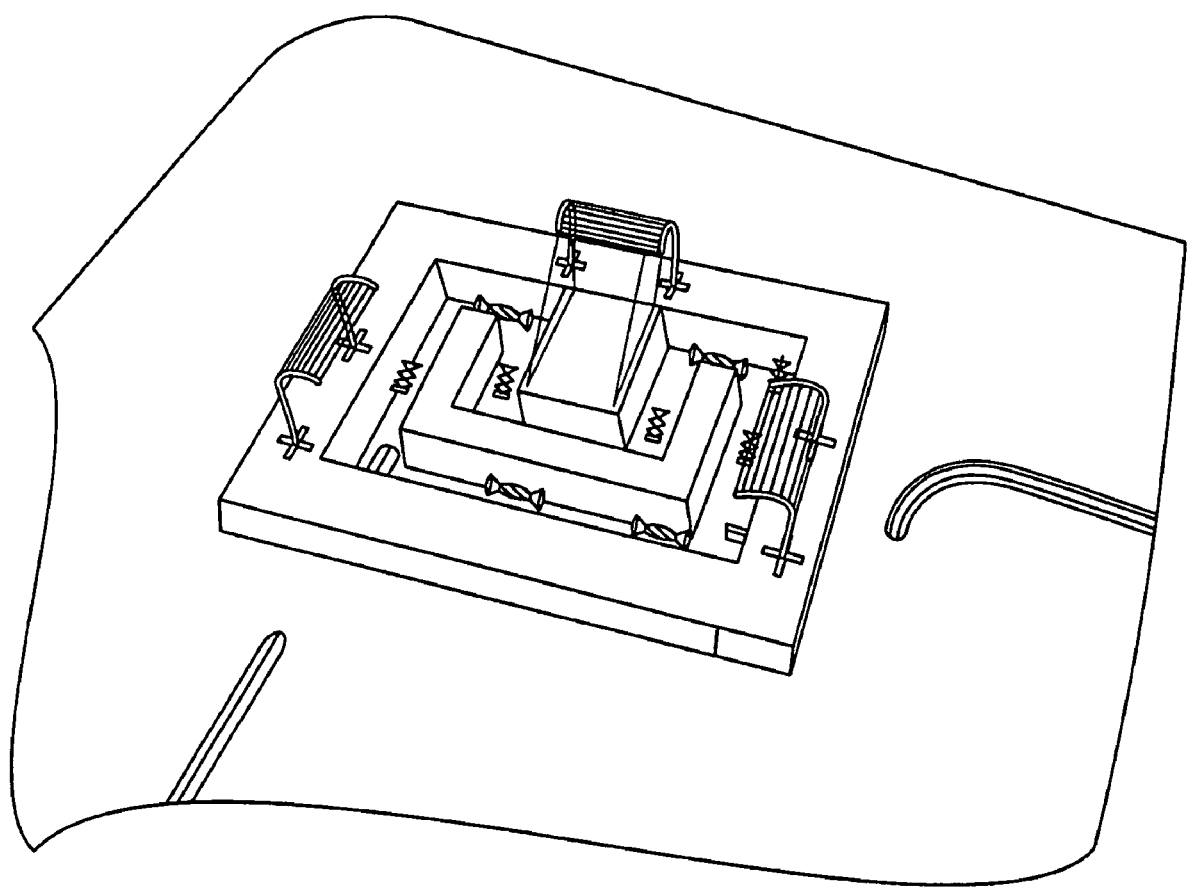
FIG. 4 is a three-dimensional conceptualization of the embodiment of FIG. 1

FIG. 4 provides a three-dimensional conceptualization of the components of the present embodiment depicted in FIG. 1.

Figure 5:
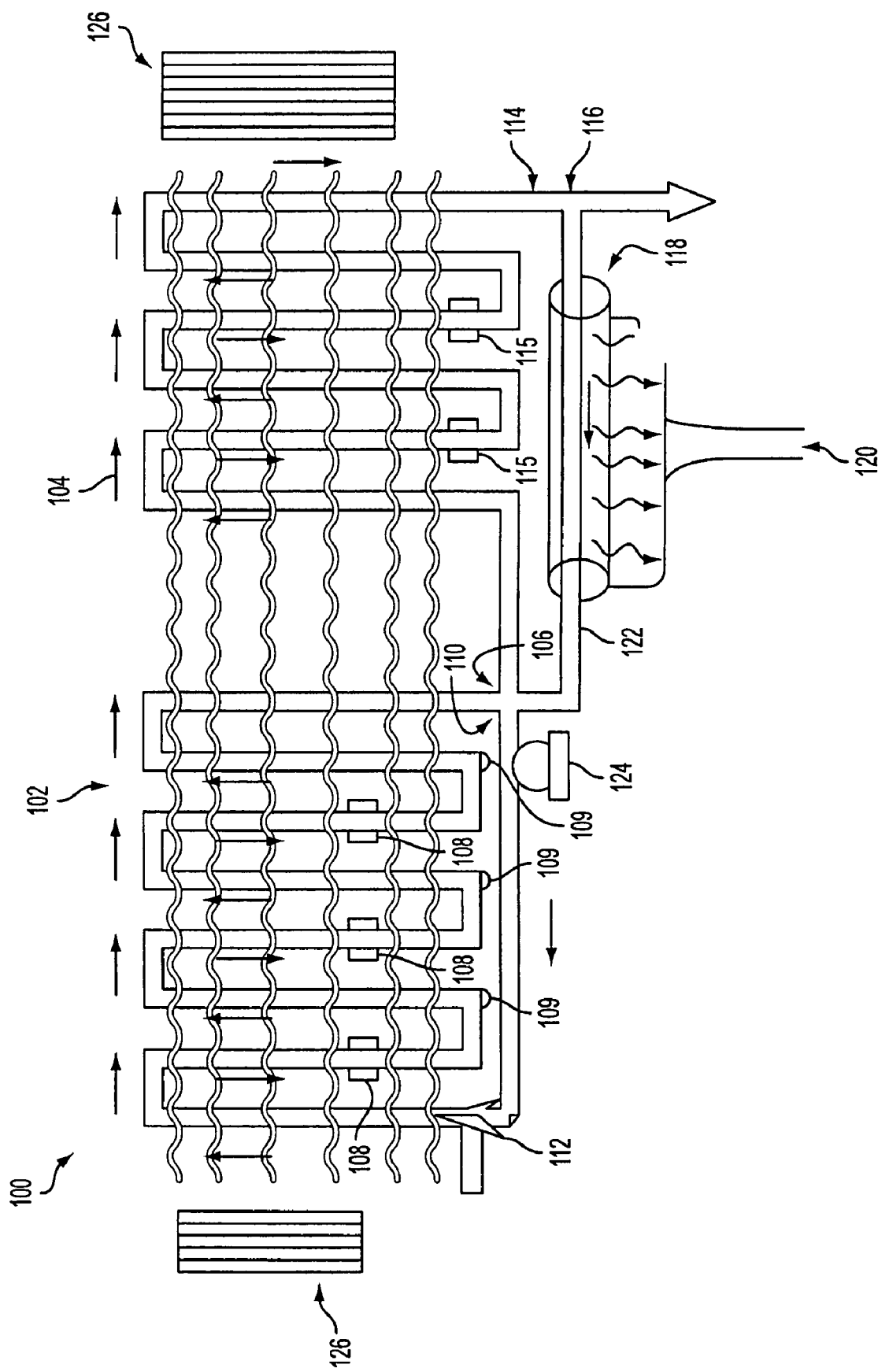
FIG. 5 depicts a further embodiment of the reactor system.

In a further embodiment, depicted in the schematic diagram of FIG. 5, the bioreactor system 100 includes two reactors in series. In this system, the two reactors 102, 104 can be open or closed. Sunlight or light from an artificial light source is directed on both reactors. In a preferred embodiment, the two reactors 102, 104 are closed tube systems. The bioreactor tubes are formed from transparent or translucent plastic or glass tubing, such as transparent PVC tubing or commercial grade borosilicate glass tube, up to 6-8 inches in diameter. The transparent or translucent quality of the tubing permits light to enter the tubing and fuel the photosynthetic processes ongoing in the algae. In this embodiment, the reaction mixture, formed from uranium-contaminated water, algae and nutrient medium, plus a portion of recycled reaction mixture, progresses through the first reactor 102. In a preferred embodiment, the reaction mixture cycles through the first reactor multiple times, with a bleed of a portion of the reaction mixture away to the second reactor 104 through a bleed outlet 106. A mixing means turns the mixture to enhance exposure of all parts of the mixture to sunlight. In the present embodiment, the mixing means includes one or more static mixers 108 inside the tubing of the first reactor 102. In a preferred embodiment, carbon dioxide is bubbled through the mixture via one or more carbon dioxide inlets 109 to enhance exposure of algae in the reaction mixture to carbon dioxide. When the mixture reaches a specified point in the circuit of the first reactor 102, it encounters a flow splitter 110, which diverts a first portion of the reaction mixture to the second reactor 104 through the bleed outlet 106, and a second portion to be recycled back to the inlet starting point 112 to begin another cycle through the first reactor 102. The portion that flows through the second reactor 104 is not subject to infusion with new algae and nutrients or to recycling. In other words, in the second reactor 104, the reaction mixture is impelled through the tubular system towards the end of the system 114 and the algae in the reaction mixture is permitted to "polish off" or remove as much uranium as it is capable of removing from the uranium left in the mixture after the mixture emerges from the first reactor 102. The second reactor system may include a mixing means 115, which turns the mixture, enhancing exposure to light. It also includes a separating means 116, through which the reaction mixture flows. The separating means 116 separates out a portion of the algae from the reaction mixture, and diverts the remaining mixture to a filter means 118 for removing any residual algae. The filter means 118 is a porous PVC pipe. In other embodiments, other filtering techniques or mechanisms, known to those in the field, can be substituted for porous PVC pipe. Purified water emerging from the filter means 118 is then drawn from the system at outlet 120. Algae and remaining liquid rinsed from the filter means 118 is recycled via a recycling means 122 including a recycle pump 124 back to first reactor 102.

Figure 6:
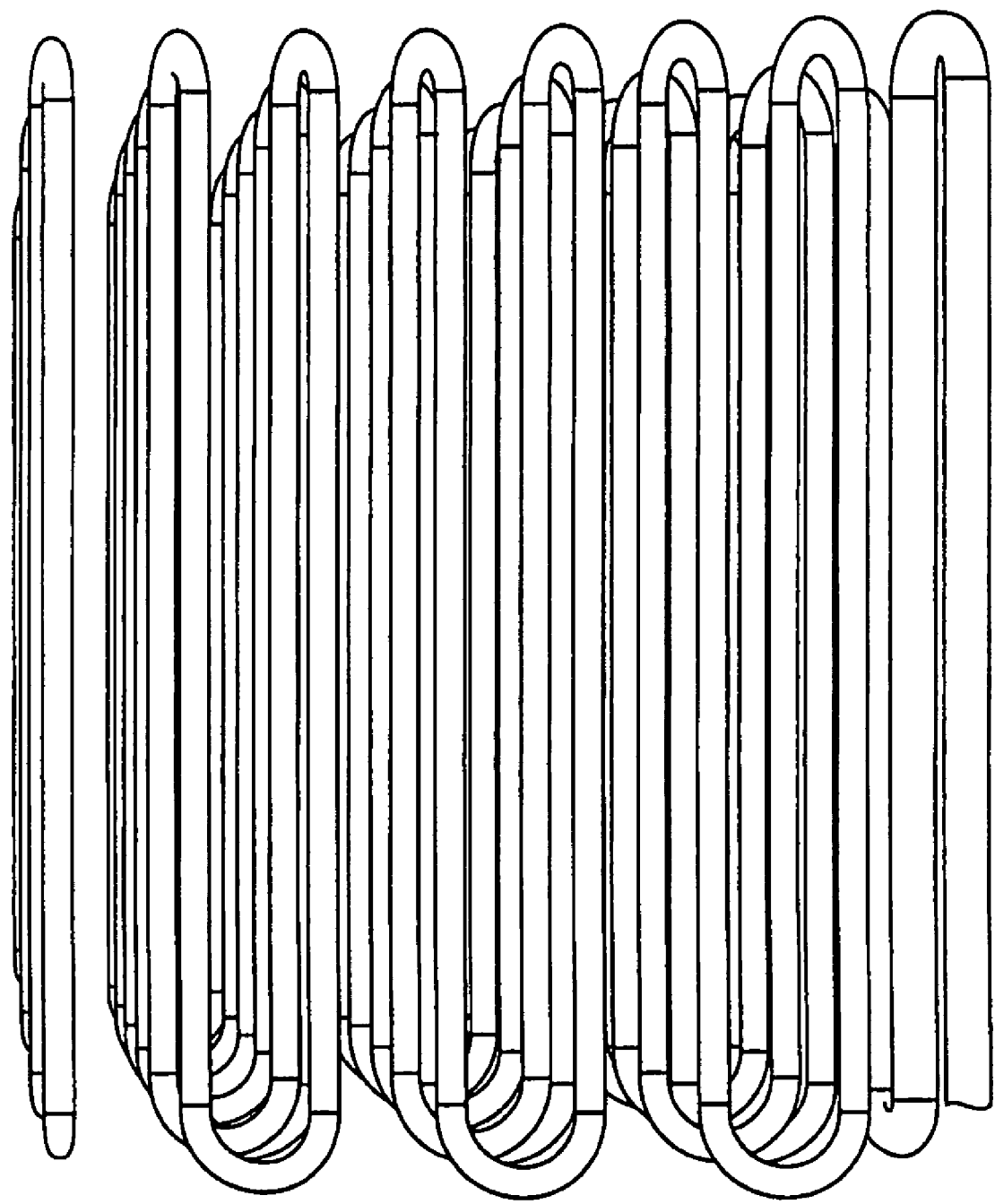
FIG. 6 depicts a looped and staggered configuration of the transparent reactor tubing of FIG. 5.

In a preferred embodiment, the two reactors of FIG. 5 are both formed from transparent tubing, such as clear PVC pipes or clear glass tubing, and the tubing is bent in a back and forth arrangement and is oriented in a skewed, sheared, or staggered configuration, as depicted in FIG. 6. This orientation of the tubing increases the area of the reaction mixture exposed to light, and reduces shading of one section of tubing by another and thereby enhances the exposure of the reaction mixture in the tubing to light. In this embodiment, one or more Fresnel lenses 126, or in other embodiments, other mechanisms for directing or reflecting light, are positioned to gather and collect light and then focus it on the reactor tubing from multiple directions, increasing the light reaching the reaction mixture. In the embodiment of FIG. 5, the light is directed towards the reactors from the sides (where the Fresnal lenses 126 are positioned) and light is depicted with wavy lines. The two reactors are exposed to natural sunlight, and in other embodiments other light sources are used, additionally or as substitutes, to enhance algal activity and production. In a further embodiment, reflective rods are positioned in between selected sections of tubing to increase the quantity of light falling on the reaction mixture. In yet another embodiment, three or more reactors be utilized, to enhance absorption of uranium or other contaminants. The present description is not intended to restrict the number of reactors used.

In another preferred embodiment, the reaction mixture in at least the first reactor 102 is mixed and circulated by bubbling of $CO_2$ gas at selected points into the reaction mixture. In this embodiment, the static mixers 108 are omitted. The same approach, of mixing and moving the reaction mixture, is employed in the second reactor, and in both reactors, in other embodiments.

In yet another embodiment, the closed reactor tubing of the embodiment of FIG. 5 is surrounded by a water bath or tank, which draws heat away from, and thereby reduces temperature fluctuations within, the reactor tubing. The water bath or tank also serves as a safety mechanism, especially beneficial in large scale applications, to catch and dilute the reaction mixture in case of leakage or breakage of reactor tubing.

The present embodiments are beneficially applied in large scale applications, such as systems for remediating contaminated waters from uranium mining sites (such as pit lakes, stream flows, and waste ponds), nuclear power plants, and waste areas associated with the nuclear weapons construction, but may also be used with smaller pallet-mounted units, capable of being transported to remote sites for cleaning up spills or for onsite evaluation.

Figure 7:
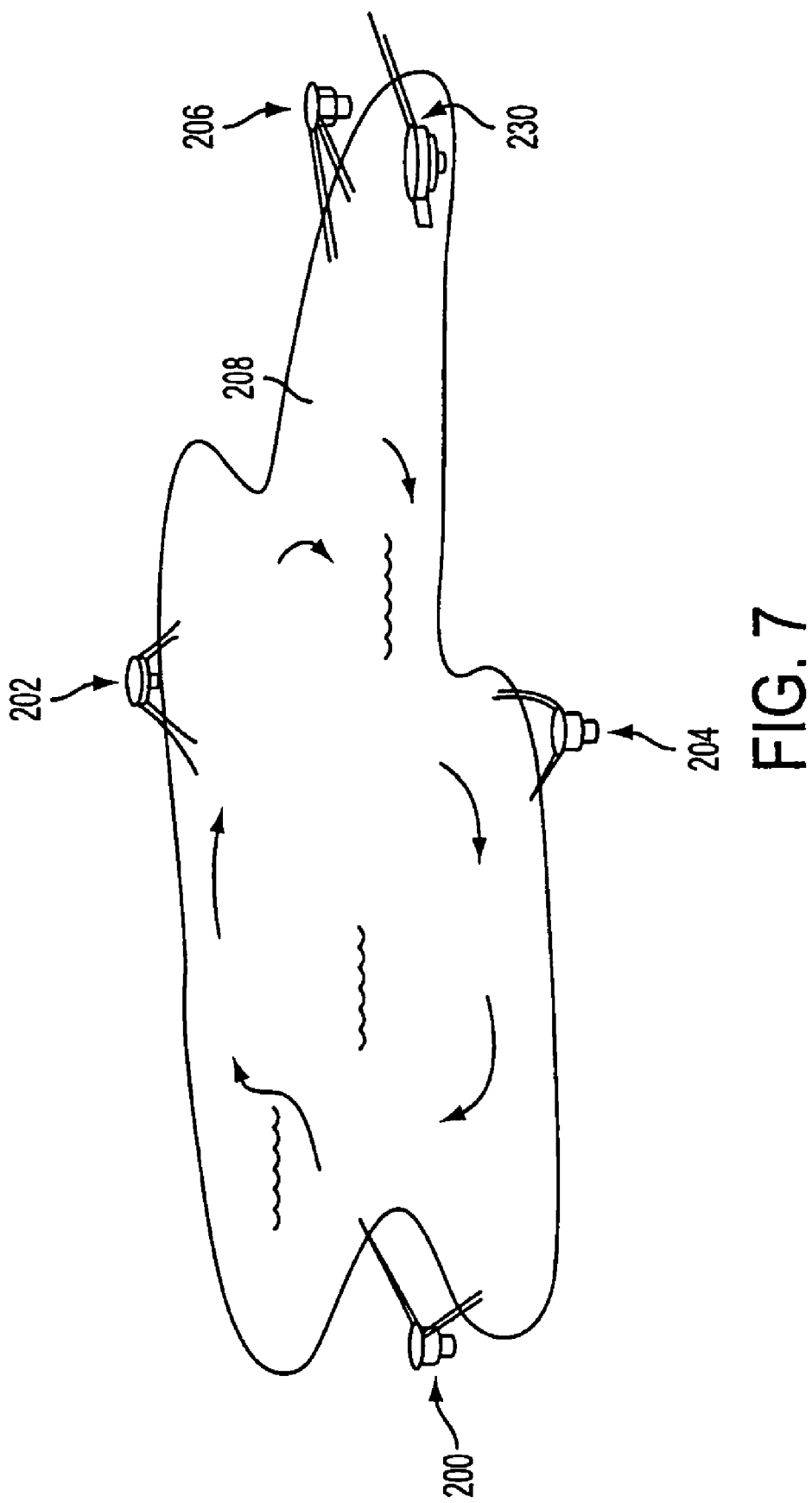
FIG. 7 depicts another embodiment, including a gas lift reactor system.
Figure 8:
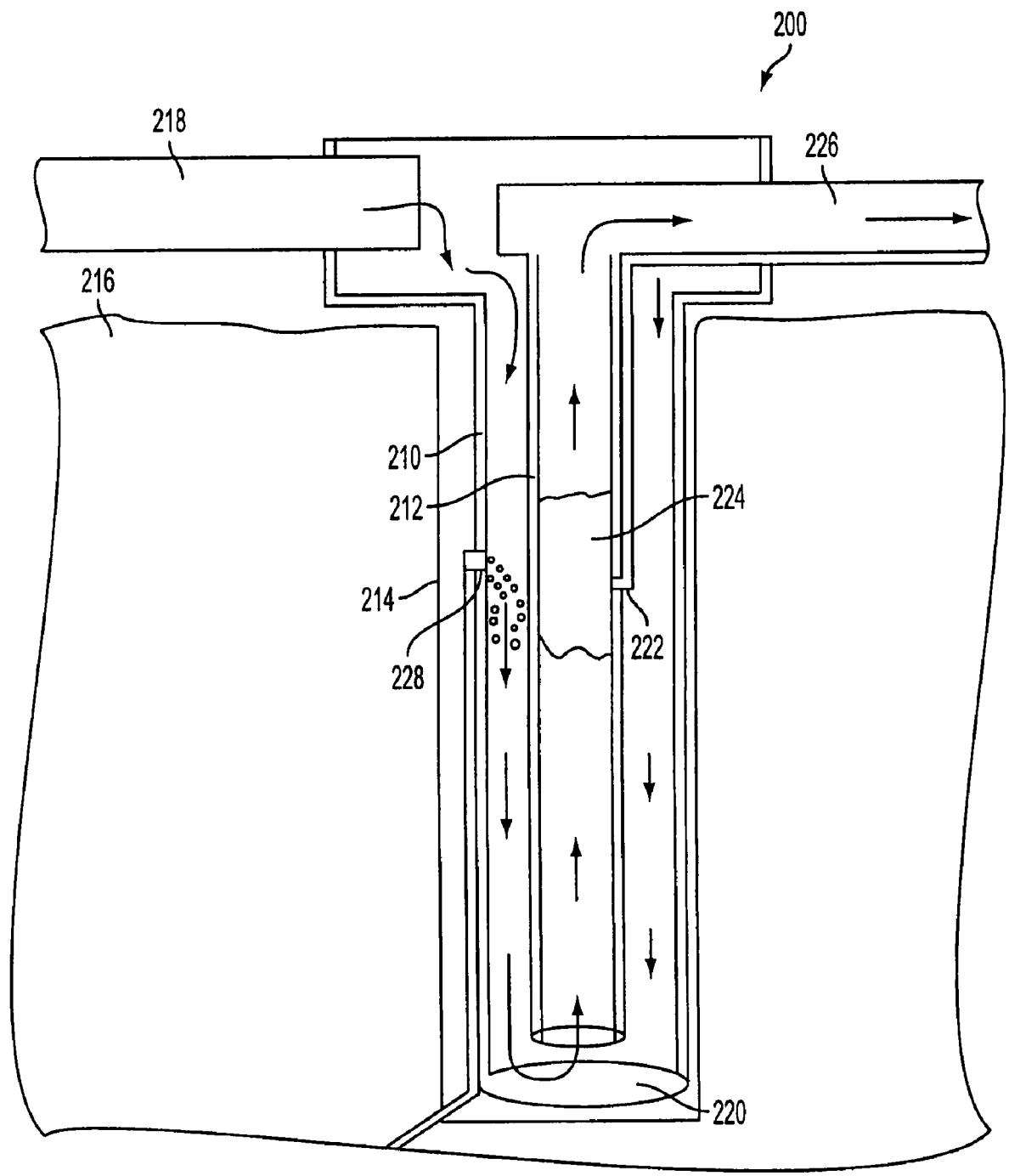
FIG. 8 provides an enlarged view of a gas lift reactor.

A further embodiment, that can be implemented on a very large scale to remediate a lake or other large body of water contaminated by uranium or other pollutants that can be removed by algae, is depicted in FIG. 7. In this embodiment, a series of gas lift reactors 200, 202, 204, 206, are positioned around a contaminated lake 208, containing dissolved uranium waste. As depicted in FIG. 8, the gas lift reactor 200 of the embodiment includes a vertically oriented down coming tube 210 and a second vertically oriented riser tube 212. In a preferred embodiment, the down coming tube 210 is inserted in a shaft 214 drilled in the ground 216, and the riser tube 212 is inserted into the center of the down coming tube 210. Water from the lake 208 is pumped into the top end of the down coming tube 210 through an inlet pipe 218, and flows into and fills the down coming tube 210. (In an alternative embodiment, where the down coming tube 210 is at a lower elevation than the lake 208, water can be piped downhill with the force of gravity to the down coming tube 210.) The down coming tube 210 is closed at its bottom end 220. As the down coming tube 210 fills with water from the lake 208, water enters the riser tube 212. Compressed air is injected into the riser tube 212 at a compressed air entry port 222 (in an alternative embodiment a compressed air tube with entry port can be inserted into the center of the riser tube 212), creating a voidage volume 224 in the riser tube 212 that causes the water in the down coming tube 210 to be drawn into the riser tube 212, and then to flow out of the riser tube 210 into an outlet pipe 226, and then back into the lake 208. The compression of air which is subsequently injected into the riser tube 212 supplies the energy that causes water to circulate in the gas lift reactor 200. A carbon dioxide port 228 is positioned on the down coming tube 210 and injects carbon dioxide gas into the water in the down coming tube 210. It should be noted that an alternative embodiment includes inserting a tube for injecting carbon dioxide gas in the interior of the down coming tube 210. The carbon dioxide substantially dissolves in the water in the down coming tube 210. Water flowing out into the lake through the riser tube 212 and the outlet pipe 226 is enriched with carbon dioxide, providing an enhanced substrate for algal growth. In FIG. 8, the flow of water into and through the gas lift reactor 200 is depicted by directional arrows. The circulation of lake water through a series of gas lift reactors 200, 202, 204, 206 positioned around the lake 208 creates a flow and mixing of water in the lake 208. The directional arrows depicted in FIG. 7 reflect a clockwise circulation pattern created by the gas lift reactors. (The pattern can also be counterclockwise, as will be appreciated.) It should be noted that other mechanisms can be used to create mixing and flow of lake waters, and introduce carbon dioxide, such as mechanical pumping and gas injection systems, and the present description does not limit the system to gas lift reactors. According to this embodiment, photosynthetic algae selected for its ability to remove uranium or other targeted contaminants is introduced into the lake 208, and allowed to circulate through the lake waters and the gas lift reactors, which enhance the carbon dioxide concentration of the lake waters. Mixing of the lake waters by the reactors increases the exposure of algae in the lake to sunlight. Referring to FIG. 7, the embodiment also includes one or more separating means 230, for separating algae from the lake water. While any of various filtering or separating devices can be used, as will be known in the art, a preferred separating means includes initial gas flotation of the algae by reducing the pH of the lake water with a substance such as phosphoric acid, to release carbon dioxide that will attach to the algae and cause it to float at the surface, where it will be concentrated. The algae can then be skimmed from the surface or surface water can be diverted through a filtering device, such as a rotary vacuum filter. Algae is thereafter removed from the filter and the uranium harvested from the algae, with remediated water either pumped back into the lake or to a holding tank or pool. As will be appreciated by those familiar with the art, other gas lift reactor structures can be utilized, including a U-tube structure similar to that used with manometers, and the gas lift reactor can be above-ground or below-ground; the present description is not intended to limit the structure to that depicted herein. In addition, the algae used can be photosynthetic, partially photosynthetic or non-photosynthetic, and the contaminant targeted for removal can be uranium, or other contaminants removable by algae as described above.

A deposit was made under the Budapest Treaty of algae of the type that are advantageous for use in embodiments of the method and system in suitable environments as described above. These deposits were made in the Australian Government Analytical Laboratories, P.O. Box 385, Pymble, NSW 2073 Australia, phone (02) 9449 0111, facsimile (02) 9449 1653 on Dec. 3, 2002. Two deposits were made. The first deposit was made of an algae with a proposed taxonomic designation of *Chlorella* sp. MM1 strain, with accession number NM02/32644. This organism was isolated from a diesel contaminated soil (Tailem Bend region) from South Australia. Its scientific description is as follows: small, round (4-6 µm) cells with one thin parietal chloroplast; reproduces through autospores; and no motile stages. Identification references include: Megharaj M. et al Arch. Environ. Contam. Toxicol. 2000, 38: 439-445; Freshwater Algae in Australia, A Guide to Conspicuous Genera (1988) by T. J. Entwistle, J. A. Sonneman and S. H. Lewis published by Saity and Associates Pty. Ltd, NSW Australia; How to Know the Freshwater Algae by G. W. Prescott (1980) Wm. C. Brown Company Publishers, Dubuque, Iowa; and Introduction to the Algae Structure and Reproduction by H. C. Bold and M. J. Wynne (1985), Prentice-Hall Inc., Englewood Cliffs, N.J. The deposit was made by Megharaj Mallavarapu of CSIRO Land and Water, PMB 2, Glen Osmond, SA 5064, Australia. The second deposit made was of an algae with a proposed taxonomic designation of *Scenedesmus* sp. MM4, and with an accession number of NM02/32645. This organism was isolated and purified from an algal mat collected from a dam water in Ballarat, Victoria. Its scientific description is as follows: cells are fusiform (9-14 μm long), uninucleate with plate like chloroplast. Cells commonly occur as four cells that lie side by side in a series (occasionally more than four cells). Identification references include Freshwater Algae in Australia, A Guide to Conspicuous Genera (1988) by T. J. Entwistle, J. A. Sonneman and S. H. Lewis published by Saity and Associates Pty Ltd, NSW, Australia; and How to Know the Freshwater Algae by G. W. Prescott (1980) Wm. C. Brown Company Publishers, Dubuque, Iowa. The deposit was made by Megharaj Mallavarapu of CSIRO Land and Water, PMB 2, Glen Osmond, SA 5064, Australia.

We claim:

1. A system for removal of a contaminant from an aqueous solution utilizing photosynthetic algae that interacts with said contaminant to remove it from the aqueous solution, wherein said contaminant is a uranium species, said system comprising:

a fluid pathway formed by at least two side walls and a floor, said fluid pathway having an inlet and an outlet coupled thereto, said fluid pathway configured for containing a reaction mixture having a quantity of said aqueous solution that includes said contaminant and a quantity of said photosynthetic algae that interacts with at least a portion of said contaminant while the reaction mixture is contained within said fluid pathway so as to remove at least a portion of said contaminant from the aqueous solution so as to produce a remediated aqueous solution, said fluid pathway being open on its top side for exposure of said reaction mixture within said fluid pathway to light and air, said inlet configured for introducing said reaction mixture into said fluid pathway and said outlet spaced apart from the inlet in said fluid pathway, for withdrawing a portion of said reaction mixture from said fluid pathway;

a mixer positioned within said fluid pathway, said mixer configured for turning said reaction mixture within said fluid pathway so as to expose at least a portion of said photosynthetic algae in the reaction mixture to light and air;

a source of carbon dioxide gas;

a carbon dioxide infuser connected to said source of carbon dioxide gas and said fluid pathway, said carbon dioxide infuser configured for introducing carbon dioxide gas into said reaction mixture; and a filter coupled to said outlet, said filter configured for separating photosynthetic algae from said reaction mixture.

2. The system of claim 1, further comprising:

a first conduit coupled to said filter, said first conduit configured for fluidly conducting said remediated aqueous solution from said filter; and a second conduit coupled to said filter, said second conduit configured for carrying said photosynthetic algae from said filter.

3. The system of claim 1, wherein the contaminant includes a plurality of uranium species.

4. The system of claim 1, wherein the contaminant is a trans-uranium element.

5. The system of claim 1, wherein the contaminant is a daughter product of uranium decay.

6. The system of claim 1, wherein the contaminant is one of a group including cobalt, chromium, strontium and cesium.

7. The system of claim 1, wherein said photosynthetic algae is selected for use in the system for its capacity to remove said contaminant from solution.

8. The system of claim 1, wherein said photosynthetic algae is a wild algae found within or proximate a source of the aqueous solution that is to be remediated by the system.

* * * * *